United States Patent
Li et al.

(10) Patent No.: US 9,354,349 B2
(45) Date of Patent: May 31, 2016

(54) SYSTEMS AND METHODOLOGY FOR DETECTING A CONDUCTIVE STRUCTURE

(75) Inventors: Shanjun Li, Katy, TX (US); Michael S. Bittar, Houston, TX (US); Dagang Wu, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/005,198

(22) PCT Filed: Nov. 18, 2011

(86) PCT No.: PCT/US2011/061414
§ 371 (c)(1),
(2), (4) Date: Sep. 13, 2013

(87) PCT Pub. No.: WO2013/074121
PCT Pub. Date: May 23, 2013

(65) Prior Publication Data
US 2014/0244174 A1    Aug. 28, 2014

(51) Int. Cl.
*G01V 1/40* (2006.01)
*G01V 3/38* (2006.01)
*E21B 47/022* (2012.01)
(Continued)

(52) U.S. Cl.
CPC ............ *G01V 3/38* (2013.01); *E21B 47/02216* (2013.01); *E21B 47/0905* (2013.01); *G01V 3/20* (2013.01)

(58) Field of Classification Search
CPC ..... E21B 47/02216; E21B 7/04; E21B 44/00; E21B 47/04; E21B 47/0905; G01D 5/2515; G01V 3/26; G01V 3/28; G01V 3/38; G01V 11/00; G01V 3/20
USPC .......................................... 702/7, 6
See application file for complete search history.

(56) References Cited

U.S. PATENT DOCUMENTS

| 4,072,200 A | 2/1978 | Morris et al. |
| 6,825,775 B2 | 11/2004 | Fling et al. |
| 7,475,741 B2 | 1/2009 | Waters |

(Continued)

FOREIGN PATENT DOCUMENTS

| CN | 1782320 A | 6/2006 |
| CN | 1966935 A | 5/2007 |

(Continued)

OTHER PUBLICATIONS

"International Application Serial No. PCT/US2011/061414, Search Report mailed Nov. 12, 2012", 6 pgs.

(Continued)

*Primary Examiner* — Gregory J Toatley
*Assistant Examiner* — Yoshihisa Ishizuka
(74) *Attorney, Agent, or Firm* — Schwegman, Lundberg & Woessner, P.A.; Benjamin Fite (57) ABSTRACT

Various embodiments include apparatus and methods to detect and locate conductive structures below the earth's surface. Tools can be configured with receiving sensors arranged to receive signals generated from a conductive structure in response to a current flowing on the conductive structure. Magnetic-related values from the signals can be processed, relative to the tool, to determine a position of a conductive structure from which the signal was generated in response to current flowing on the conductive structure. Additional apparatus, systems, and methods are disclosed.

5 Claims, 8 Drawing Sheets (51) Int. Cl.
*G01V 3/20* (2006.01)
*E21B 47/09* (2012.01)

(56) References Cited

U.S. PATENT DOCUMENTS

| | | | |
|---|---|---|---|
| 7,657,377 B2 | 2/2010 | Sinclair et al. | |
| 7,812,610 B2 | 10/2010 | Clark et al. | |
| 8,289,024 B2 | 10/2012 | Clark et al. | |
| 2006/0113112 A1 | 6/2006 | Waters | |
| 2007/0126426 A1 | 6/2007 | Clark et al. | |
| 2007/0168134 A1 | 7/2007 | Strack et al. | |
| 2009/0120691 A1* | 5/2009 | Waters et al. | 175/45 |
| 2010/0155139 A1 | 6/2010 | Kuckes | |
| 2011/0282583 A1* | 11/2011 | Clark | 702/6 |
| 2014/0188391 A1 | 7/2014 | Li et al. | |

FOREIGN PATENT DOCUMENTS

| | | |
|---|---|---|
| CN | 101730855 A | 6/2010 |
| SU | 960701 A1 | 9/1982 |
| WO | WO-2008030982 A2 | 3/2008 |
| WO | WO-2010059263 A1 | 5/2010 |
| WO | WO-2013074121 A1 | 5/2013 |

OTHER PUBLICATIONS

"International Application Serial No. PCT/US2011/061414, Written Opinion mailed Nov. 12, 2012", 8 pgs.
"Australian Application Serial No. 2011381066, Voluntary Amendment filed May 6, 2014", 37 pgs.
"International Application Serial No. PCT/US2011/061414, International Preliminary Report on Patentability mailed Mar. 5, 2014", 14 pgs.
"International Application Serial No. PCT/US2011/061414, Invitation to Pay Additional Fees and Partial International Search mailed Jul. 26, 2012", 5 pgs.
"Canadian Application Serial No. 2,856,036, Response filed Nov. 25, 2014 to Office Action mailed Jul. 21, 2014", 11 pgs.
"U.S. Appl. No. 14/196,437, Non Final Office Action mailed Sep. 29, 2014", 22 pgs.
"Canadian Application Serial No. 2,856,036, Office Action mailed Jul. 21, 2014", 2 pgs.
"U.S. Appl. No. 14/196,437, Final Office Action mailed Mar. 5, 2015", 24 pgs.
"U.S. Appl. No. 14/196,437, Preliminary Amendment filed Mar. 28, 2014", 11 pgs.
"U.S. Appl. No. 14/196,437, Response filed Jan. 27, 2015 to Non Final Office Action mailed Sep. 29, 2014", 19 pgs.
"Chinese Application Serial No. 201180074928.9, Office Action mailed Mar. 4, 2015", (w/ English Translation), 14 pgs.
"U.S. Appl. No. 14/196,437, Response filed Aug. 5, 2015 to Final Office Action mailed Mar. 5, 2015", 18 pgs.
"Chinese Application Serial No. 201180074928.9, Response filed Jul. 16, 2015 to Office Action mailed Mar. 4, 2015", (w/ English Translation of Amended Claims), 16 pgs.
"European Application Serial No. 11788321.5, Office Action mailed Jun. 18, 2014", 2 pgs.
"European Application Serial No. 11788321.5, Response filed Sep. 26, 2014 to Office Action mailed Jun. 18, 2014", 27 pgs.
"International Application Serial No. PCT/US2011/061414, Response filed Sep. 12, 2013 to Written Opinion mailed Nov. 12, 2012", 7 pgs.
"U.S. Appl. No. 14/196,437, Non Final Office Action mailed Sep. 15, 2015", 16 pgs.
Russian Federation Application Serial No. 2014124716, Office Action mailed Feb. 5, 2016, (w/ English Translation), 25 pgs.

* cited by examiner

Fig.1

ACQUIRE SIGNALS CORRESPONDING TO RECEIVED SIGNALS IN TWO RECEIVER SENSORS OF A TOOL DISPOSED BELOW THE EARTH'S SURFACE, THE TWO RECEIVER SENSORS ARRANGED ORTHOGONAL TO EACH OTHER ⸺ 210

GENERATE MAGNETIC-RELATED VALUES FROM THE ACQUIRED SIGNALS ⸺ 220

PROCESS THE MAGNETIC-RELATED VALUES TO DETERMINE, RELATIVE TO A STRUCTURE TO WHICH THE TWO RECEIVER SENSORS ARE COUPLED, A POSITION OF A CONDUCTIVE STRUCTURE FROM WHICH THE RECEIVED SIGNALS WERE GENERATED IN RESPONSE TO CURRENT FLOWING ON THE CONDUCTIVE STRUCTURE ⸺ 230

SYSTEMS AND METHODOLOGY FOR DETECTING A CONDUCTIVE STRUCTURE

RELATED APPLICATIONS

This application is a U.S. National Stage Filing under 35 U.S.C. 371 from International Application No. PCT/US2011/061414, filed on 18 Nov. 2011, and published as WO 2013/074121 A1 on 23 May 2013; which application and publication are incorporated herein by reference in their entirety.

TECHNICAL FIELD

The invention relates generally to apparatus for making measurements related to oil and gas exploration.

BACKGROUND

In drilling wells for oil and gas exploration, understanding the structure and properties of the associated geological formation provides information to aid such exploration. In addition, drilling can be enhanced with systems and methods to detect conductive structures below the earth's surface. The conductive structures can include metal piping used in various drilling techniques, where the positioning of the metal piping can be important to the drilling operation.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Figure 1:
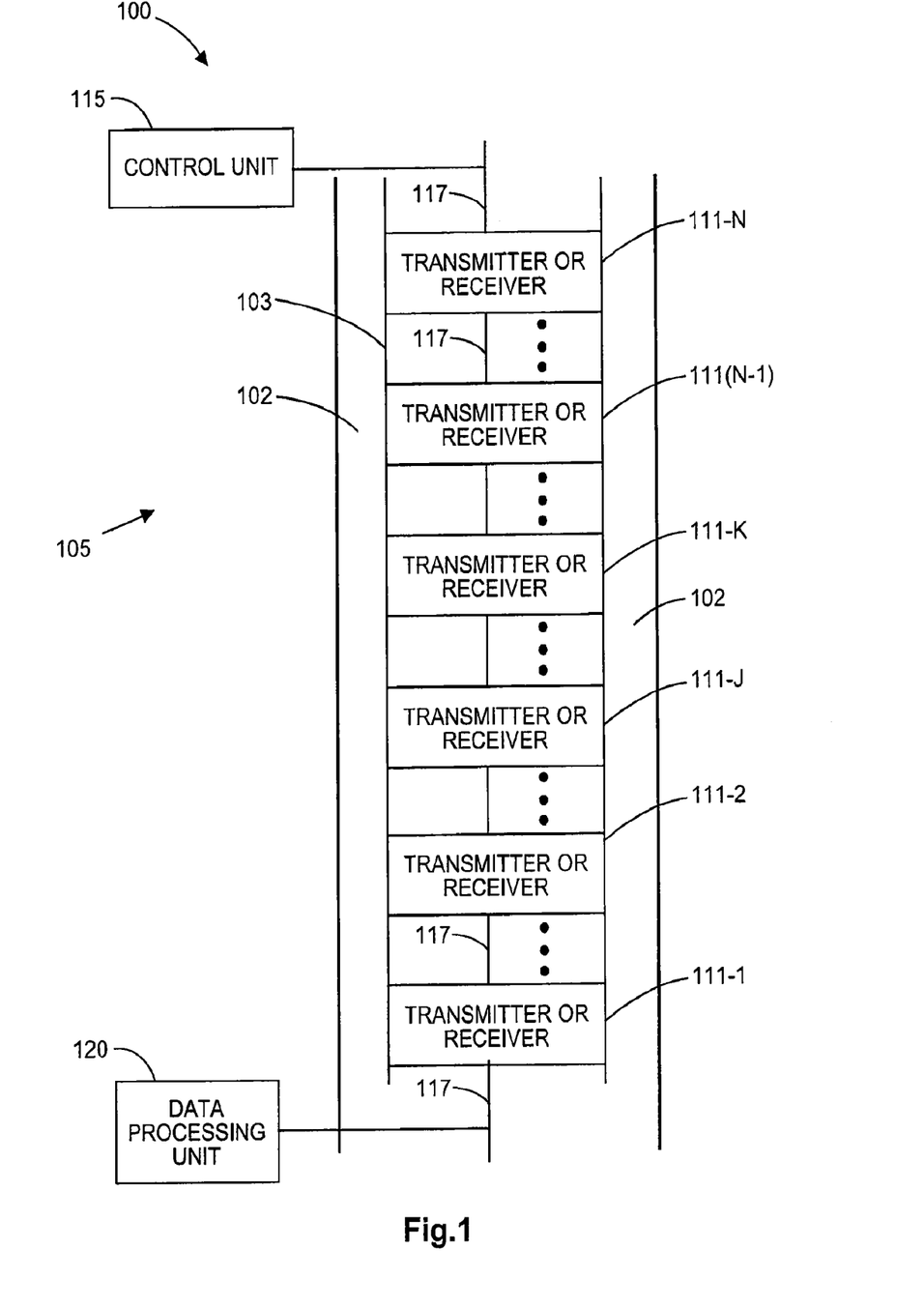
FIG. 1 illustrates an example system operable to determine a position of a conductive structure, in accordance with various embodiments.

FIG. 1 shows a block diagram of an embodiment of a system 100 having a tool 105 to determine a position of a conductive structure. System 100 includes a tool structure 103 having an arrangement of sensors 111-1, 111-2 . . . 111-(N−1), 111-N along a longitudinal axis 117 of tool structure 103. Each sensor 111-1, 111-2 . . . 111-(N−1), 111-N can be utilized as a transmitting sensor or a receiving sensor under the control of control unit 115 operating in region 102. Tool 105 and the methods of using tool 105 can be applied in deep-water exploration to obtain structure dip angle, azimuth, and resistivities, $R_h$ and $R_v$.

Two sensors 111-J and 111-K of the sensors 111-1, 111-2 . . . 111-(N−1), 111-N can be structured to determine the position of a conductive structure relative to tool structure 103. The two sensors 111-J and 111-K can be arranged as receiver sensors with the two sensors 111-J and 111-K oriented orthogonal to each other. Tool 105 may be realized as a tool dedicated to determine a position of a conductive structure, where the tool consists of one or more pairs of receiver sensors with receiver sensor of each pair oriented orthogonal to each other.

Tool 105 can include a control unit 115 operable to manage collection of received signals at the receiver sensors 111-J and 111-K with respect to current flowing on a conductive structure below the earth's surface to determine the relative position of the conductive structure. Such a determination can be realized in a data processing unit 120 of tool 105, where data processing unit 120 can be structured to process the received signals to determine a position of the conductive structure. System 100 can include a current transmitter to flow current on the conductive structure. The current transmitter can be managed by control unit 115.

Data processing unit 120 and control unit 115 can be structured to be operable to generate magnetic-related values from the received signals at receiver sensors 111-J and 111-K; and to process the magnetic-related values to determine, relative to the tool structure 103, the position of the conductive structure from the magnetic-related values and a bin angle associated with the receiver sensors 111-J and 111-K attached to the tool structure 103. Tool structure 103 may be part of a drilling pipe and the conductive structure, whose position is under determination, may be a casing in formation layers below a surface of a drilling region of a well. The conductive structure may be a casing in formation layers below the bottom of a water region, for example, associated with offshore drilling. The conductive structure may include other piping and conductive structures associated with drilling operations.

Figure 2:
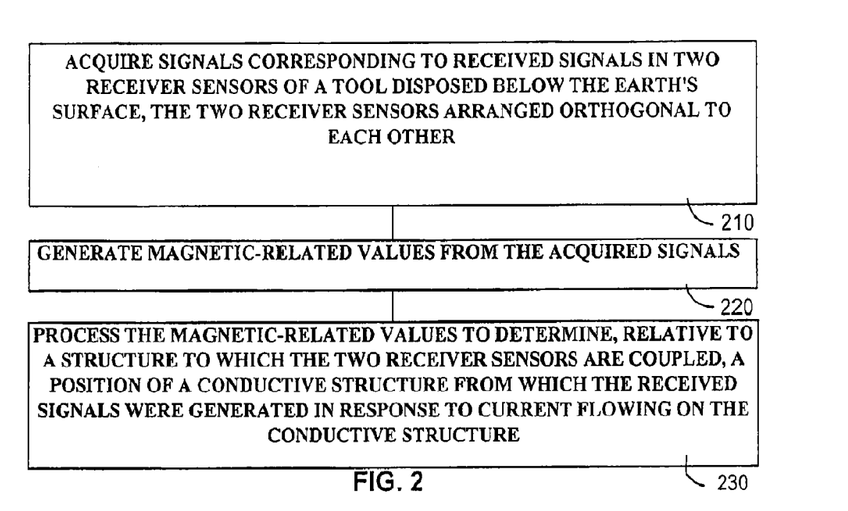
FIG. 2 shows features of an example method of determining a position of a conductive structure relative to a tool structure on which receiver sensors are mounted, in accordance with various embodiments.

FIG. 2 shows features of an example method of determining a position of a conductive structure relative to a tool structure on which receiver sensors are mounted. At 210, signals corresponding to received signals in two receiver sensors of a tool disposed below the earth's surface are acquired. The two receiver sensors can be arranged oriented orthogonal to each other. The signals received at the two receiver sensors can be measured voltages that correspond to a magnetic field at the receiver sensors. Attaining the received signals can include using two receiver coils on the tool oriented orthogonal to each other to collect the signals generated from the conductive structure. The tool structure may be oriented parallel with the conductive structure. The conductive structure can include a casing associated with a well and the tool structure can be structured as part of a drilling pipe.

At 220, magnetic-related values from the acquired signals are generated. The magnetic-related values may be ratios of the maximum measured magnetic field and the minimum measured magnetic field. The magnetic-related values may be ratios of x and y components of a measured magnetic field. The magnetic-related values may be ratios of tangential and normal components of a measured magnetic field.

At 230, the magnetic-related values are processed to determine, relative to a structure to which the two receiver sensors are coupled, a position of a conductive structure from which the received signals were generated in response to current flowing on the conductive structure. The current flowing on the conductive structure can include directly generating the current on the conductive structure. Processing the magnetic-related values can include calculating distance to the conductive structure based on the generated magnetic-related values. Processing the magnetic-related values can include calculating an azimuthal angle of the tool relative to the conductive structure based on the generated magnetic-related values.

Determining a position of a conductive structure relative to a structure on which a tool, having two receiver sensors, is mounted can include collecting received signals at the two receiver sensors with the tool rotating; associating the received signals with a bin of the tool, the bin corresponding to an angle of the tool when the signals are collected; collecting additional received signals and assigning the additional received signals to different bins, each bin corresponding to an azimuthal direction of the rotating tool; and determining angular position of the conductive structure, relative to the relative to the structure to which the two receiver sensors are coupled, from determining which bin includes a largest absolute value of a difference between a maximum magnetic-related value derived from the received signal in the respective bin and an average magnetic-related value.

Determining the position of the conductive structure can include determining, with no current on the tool structure and with value of the current on the conductive structure unknown, distance (Dis) with respect to a ratio related to minimum magnetic field measured, $H_{Minimum}$, and maximum magnetic field measured, $H_{Maximum}$. Determining the position of the conductive structure can include determining, with current on the tool structure, distance (Dis) with respect to a ratio related to minimum magnetic field measured, $H_{Minimum}$, and maximum magnetic field measured, $H_{Maximum}$.

Determining a position of a conductive structure relative to a structure on which a tool, having two receiver sensors, is mounted can include collecting received signals at the two receiver sensors with the tool in a non-rotating mode; generating magnetic-related values based on the received signals as orthogonal magnetic-related component values; and calculating the angular position of the conductive structure relative to the tool using the orthogonal magnetic-related component values and a bin angle of the tool in the non-rotating mode.

Determining a position of a conductive structure relative to a structure on which a tool, having two receiver sensors, is mounted can include associating the received signals at the receiver sensors with a bin angle of the tool, the bin angle corresponding to an angle of the tool when the received signals are collected; and performing an inversion process using a measured parameter of the received signal and the bin angle to generate an azimuthal angle of the tool with respect to the conductive structure. Performing the inversion process can include using curve-fitting functions.

In various embodiments, a tool is operated to determine the relative position of a conductive structure in a formation with respect to a structure on which the tool is mounted. The tool can operate according to various embodiments of a methodology that operates on signals received by the tool from the conductive structure. The position can be determined by computing the relative azimuthal angle of the conductive structure with respect to the tool based on the receive signals and by computing the distance between the structure on which the tool is mounted and the conductive structure based on the received signals. Different methodologies can be applied based on the settings of receivers on the tool, for example operating as a rotating tool or as a non-rotating tool. The tool and methodologies can be applied to a casing of a drilling operation with respect to a drilling/logging tool.

Figure 3:
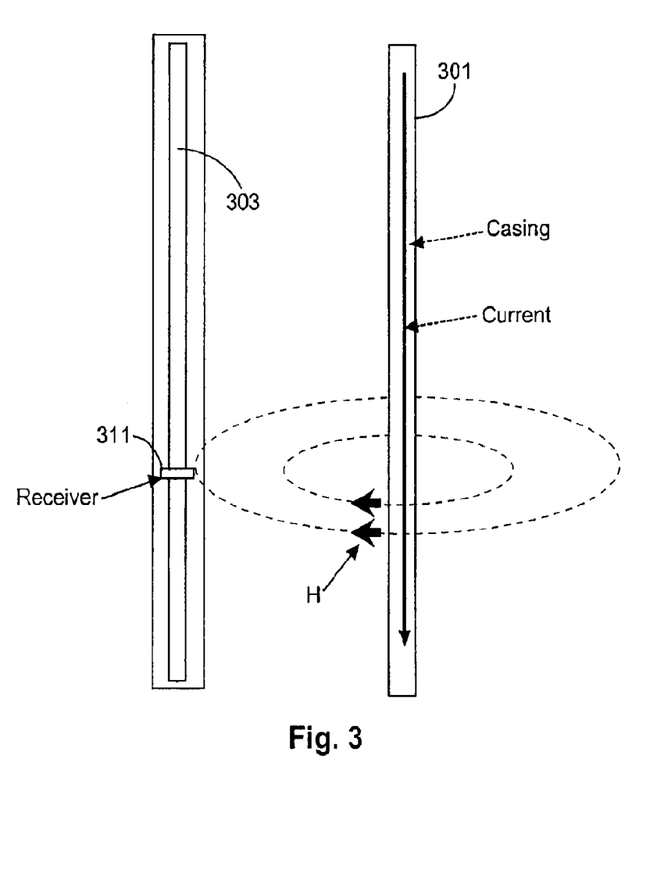
FIG. 3 shows an example of a current on a casing that induces a magnetic field that is detected by a receiver on a drilling pipe, in accordance with various embodiments.

A tool can be operated based on signals received from the conductive structure that the tool is being used to detect. The source of the signals, which can be used to detect the conductive structure such as a casing, can be a current flowing on the conductive structure. This current can be induced by another source or can be applied to the conductive structure directly. The current on the conductive structure can induce magnetic fields around the conductive structure, which can be measured by receivers mounted on the tool. The measured signal from the receivers can be used to determine the position of the conductive structure. The receivers can be mounted on a drilling pipe to determine the position of a casing relative to the drilling pipe. FIG. 3 shows an example of a current on a casing 301 that induces a magnetic field that is detected by a receiver 311 on a drilling pipe 303.

Figure 4:
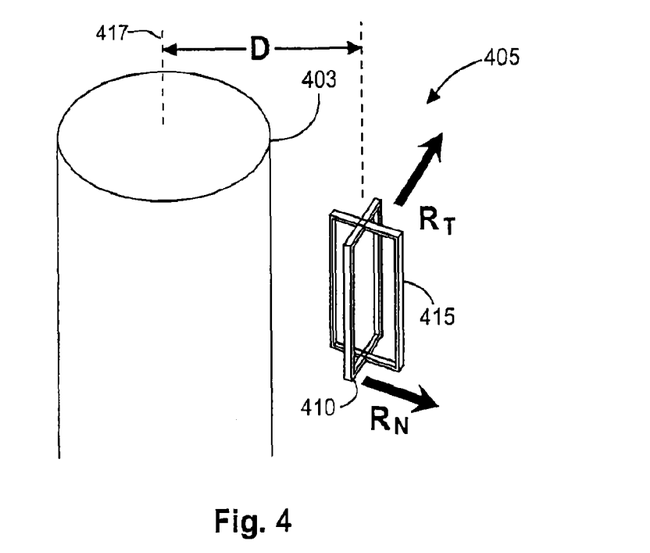
FIG. 4 shows an example tool to detect a conductive structure in a formation, in accordance with various embodiments.

FIG. 4 shows an example embodiment of a tool 405 to detect a conductive structure in a formation. Tool 405 can include receivers 410, 415 selected as orthogonal coils. Receivers 410, 415 of tool 405 can be arranged as intersecting coils, where D is the distance between the center of the receiving coils 410, 415 and the center 417 of the drilling pipe 403 on which tool 405 is disposed. One coil 410, referred to herein as $R_N$, can be positioned parallel with the surface of a drilling pipe 403 and the other coil 415, referred to herein as $R_T$, can be positioned perpendicular to the surface of drilling pipe 403. The measurements on $R_N$ and $R_T$ can be realized as voltages induced by normal and tangential magnetic fields, respectively. The measurements can be transferred to X and Y directional measurements with a tool rotation operation.

Figure 5:
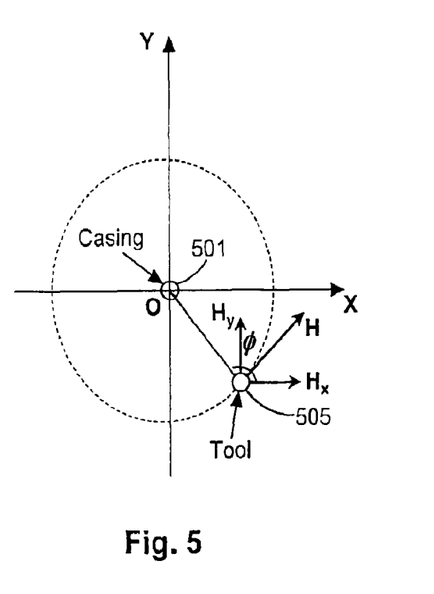
FIG. 5 shows a relationship between a conductive structure and receivers of a tool disposed on a structure parallel to the conductive structure, in accordance with various embodiments.

FIG. 5 shows a relationship between a conductive structure 501 and receivers of a tool 505 disposed on a structure parallel to the conductive structure 501. The relationship is shown as a relative azimuthal angle of conductive structure 501 with respect to tool 505. X-direction and Y-direction components of a magnetic field are generated at tool 505 by the current on conductive structure 501. The structure can be realized as a drilling pipe parallel to a casing, where the casing is conductive structure 501, whose position is to be determined.

Figure 6:
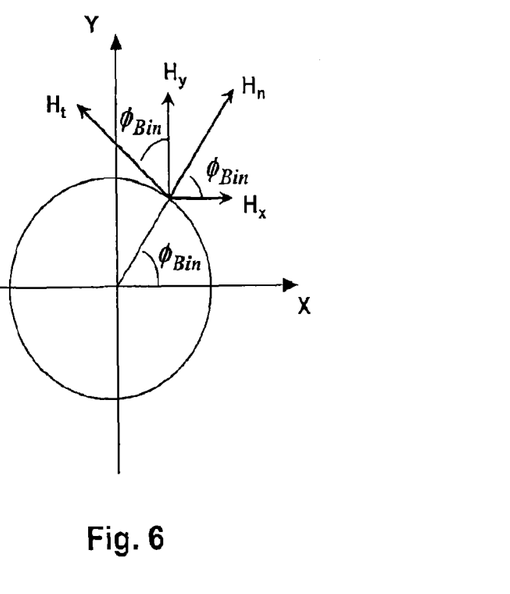
FIG. 6 shows tangential and normal magnetic fields on the surface of the structure on which the tool of FIG. 5 is disposed, in accordance with various embodiments.

FIG. 6 shows tangential and normal magnetic fields on the surface of the structure on which tool 505 of FIG. 5 is disposed. The tangential and the normal magnetic fields can be computed by the following formula from X-direction and Y-direction components:

$$H_t = -H_x \sin(\phi_{Bin}) + H_y \cos(\phi_{Bin}), \quad (1a)$$

$$H_n = +H_x \cos(\phi_{Bin}) + H_y \sin(\phi_{Bin}), \quad (1b)$$

where $H_t$, $H_n$, $H_x$, and $H_y$ represent tangential, normal, X-direction, and Y-direction magnetic fields. The angle $\phi_{Bin}$ is the bin angle. For a tool that can be rotated, such as being arranged on a drilling pipe that rotates, the rotation can be divided into a number of equal partitions of 360 degrees of rotation, where the partitions are referred to as bins. For example, measurements over 360 degrees can be divided into 32 bins, where each bin covers 11.25 degrees. The number of bins can be less than or more than 32 bins. The tool can be operated without rotation, while making measurements relative to a bin. Corresponding tangential and normal voltage measurements, $V_t$ and $V_n$ can be expressed as $$V_t = -V_x \sin(\phi_{Bin}) + V_y \cos(\phi_{Bin}), \quad (1c)$$

$$V_n = +V_x \cos(\phi_{Bin}) + V_y \sin(\phi_{Bin}), \quad (1d)$$

where $V_x$ and $V_y$ represent the voltage measurements of X and Y directional coils, respectively. Since measured voltages and magnetic fields can be transferred between each other, the following discussion can be based on measured magnetic fields, but are applicable for the measured voltages.

Figure 7A:
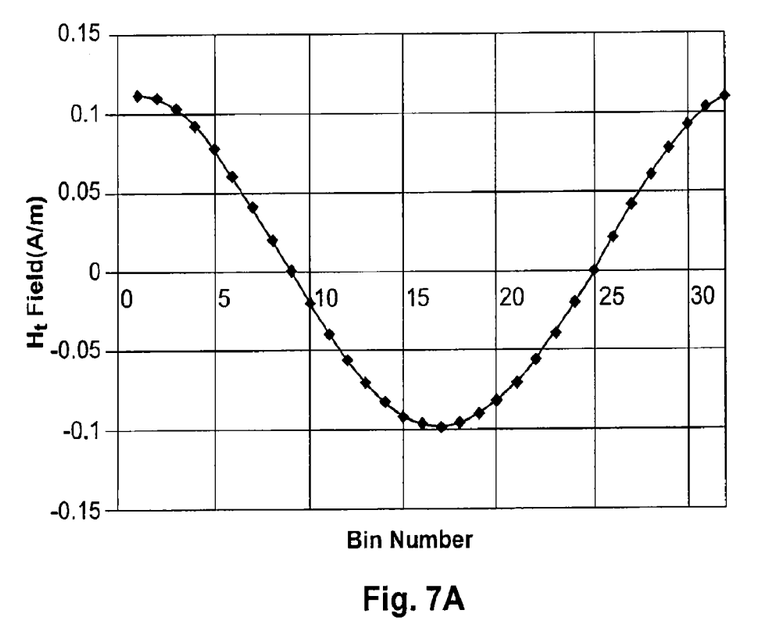
FIGS. 7A and 7B show simulated tangential measurements of a receiver of FIG. 4, in accordance with various embodiments.
Figure 7B:
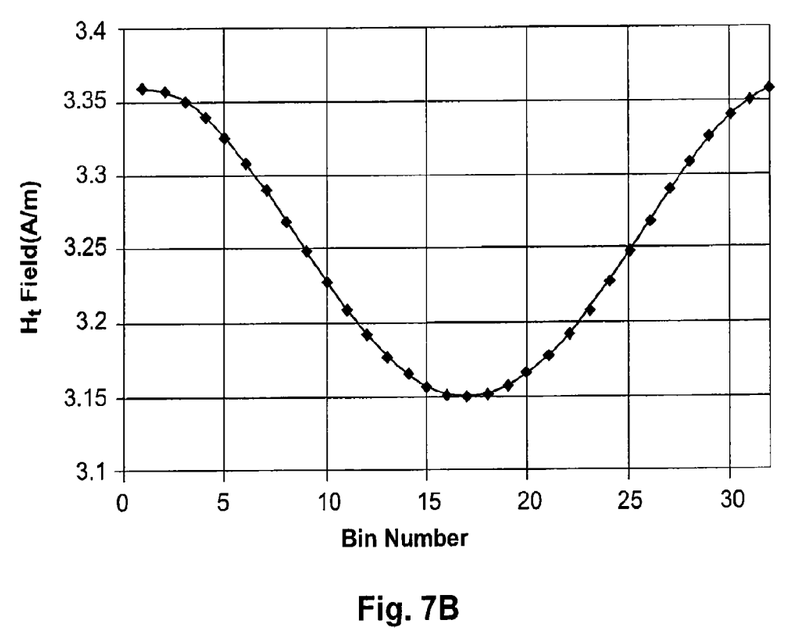

FIGS. 7A and 7B show simulated tangential measurements of receiver $R_T$ of FIG. 4. FIG. 7A displays the simulated results of tangential measurements with respect to bin number for a drilling pipe without current flowing. FIG. 7B displays the simulated results of tangential measurements with respect to bin number for the drilling pipe with current flowing. The simulated magnetic field in FIG. 7B should be a shift from FIG. 7A, since the measurement of $R_T$ includes the magnetic field induced by the current on the drilling pipe, directly, which is independent to the rotation angle. The curves, shown in FIGS. 7A and 7B, look like a sinusoidal curves, but actually are not, since $|H_{Maximum} - H_{Average}|$ not equal to $|H_{Minimum} - H_{Average}|$. The difference between these two differences can be used to compute the distance from a structure, on which a tool is located, to a conductive structure, such as the distance from a drilling pipe to a casing.

Figure 8:
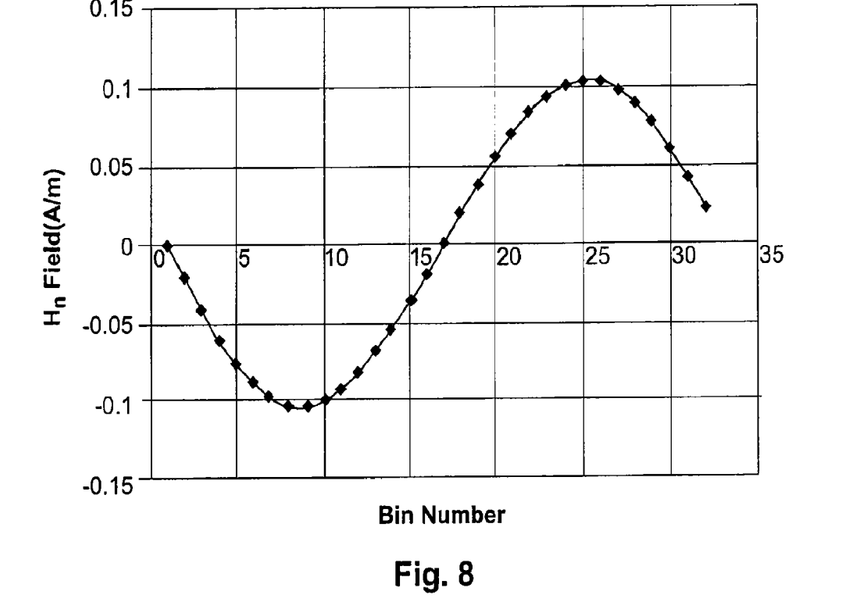
FIG. 8 shows measurements of a normal component of a magnetic field with respect to bin number, in accordance with various embodiments.

FIG. 8 shows measurements of a normal component of a magnetic field with respect to bin number. The measurements of $R_N$ display 90° bin shift from $R_T$ measurements. Since the $R_T$ measurements are not sensitive to the magnetic field induced by the current on drilling pipe, the $R_T$ measurements only reflect the conductive structure such as a casing.

If measurements of the tangential component are taken, the corresponding bin number with maximum values of $|H_{Maximum} - H_{Average}|$ and $|H_{Minimum} - H_{Average}|$ points to the direction of the conductive structure. Hence, the direction of the conductive structure can be extracted from real-time bin curves. In addition, the conductive structure is located at the plane, which is perpendicular to the direction from the bin with minimum value to the bin with maximum value of $R_N$ measurements.

If the structure on which the tool is disposed does not rotate, for example when the tool slides down a borehole, the shape of curve with respect to bin number, shown in FIG. 8, cannot be obtained. Nevertheless, equation (2a) and equation (2b) can be used to compute the azimuthal angle of the conductive structure with respect to the X direction, shown in FIGS. 5 and 6, if the current on the structure is DC.

$$\phi = \frac{\pi}{2} + \tan^{-1}\left(\frac{H_y}{H_x}\right), \text{ for } H_x > 0. \quad (2a)$$

$$\phi = \frac{3\pi}{2} + \tan^{-1}\left(\frac{H_y}{H_x}\right), \text{ for } H_x > 0. \quad (2b)$$

where $$H_x = -H_t \sin(\phi_{Bin}) + H_n \cos(\phi_{Bin}), \quad (2c)$$

$$H_y = H_t \cos(\phi_{Bin}) + H_n \sin(\phi_{Bin}), \quad (2d)$$

Figure 9:
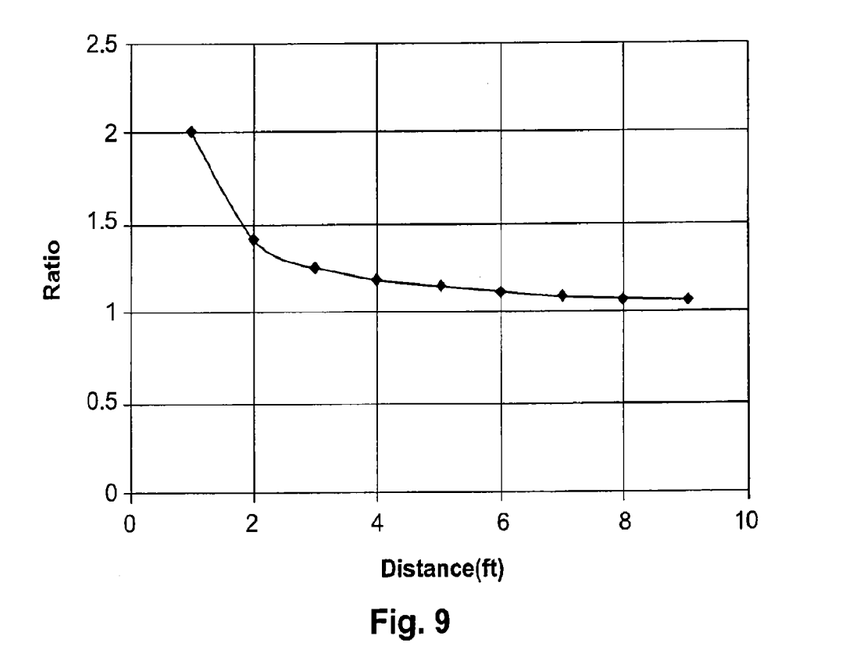
FIG. 9 shows a relationship between distance and the ratio of maximum magnetic field and minimum magnetic field, in accordance with various embodiments.
Figure 10:
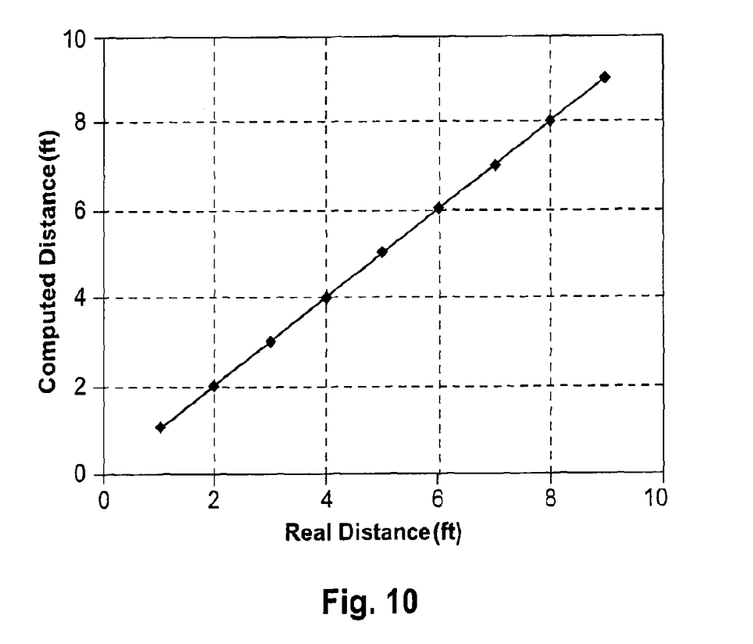
FIG. 10 shows a relationship between the real distance and computed distance, in accordance with various embodiments.

If there is no current on the structure containing the tool and the current on the conductive structure is unknown, the following formula can be used to compute the distance from the drilling tool to the casing:

$$Dis = k_1 \frac{(1 + \alpha_1) \cdot D}{1 - \alpha_1} \quad (3a)$$

$$Dis = \frac{k_1(\alpha_2 + 1) \cdot D}{\alpha_2 - 1} \quad (3b)$$

where $$\alpha_1 = \text{abs}\left(\frac{H_{Minimum}}{H_{Maximum}}\right),$$

$$\alpha_2 = \text{abs}\left(\frac{H_{Maximum}}{H_{Minimum}}\right)$$

and $k_1$ is a constant which can be determined by calibration. FIG. 9 shows a relationship between the distance and the ratio $\alpha$ for D=4 inch, where the distance D is shown in FIG. 4 and $\alpha$ is the one of $(1-\alpha_1)$ or $(\alpha_2-1)$ that is greater than zero. FIG. 10 shows a relationship between the real distance and computed distance.

If the current on a conductive structure, such as a casing, is known, the average of absolute maximum measurement value and the absolute minimum measurement value can be used to compute the distance with the following formula:

$$Dis = k_2 \frac{I}{H_{average}}, \quad (4)$$

where $$H_{average} = \frac{|H_{Maximu}| + |H_{Minimum}|}{2},$$

I is the current on the conductive structure, $k_2$ is a constant, which can be determined by calibration. If equation (3) is used to compute the distance and this distance is substituted into equation (4), an equivalent current on the conductive structure can be computed:

$$I = \frac{k_1}{k_2} \frac{(1 + \alpha_1) \cdot D}{1 - \alpha_1} H_{average} \quad (5a)$$

$$I = \frac{k_1}{k_2} \frac{(1 + \alpha_2) \cdot D}{\alpha_2 - 1} H_{average} \quad (5b)$$

Once the equivalent current is known, it can be used to compute the distance to the conductive structure with the following formula when the tool slides down and does not rotate, since the current on a conductive structure such as a casing drops very slowly:

$$Dis = k_3 \frac{I}{H_0}, \quad (6)$$

where $H_0 = \sqrt{H_x^2 + H_y^2}$ or $H_0 = \sqrt{H_T^2 + H_N^2}$ and $k_3$ is a constant, which can be determined by calibration.

If the structure on which the tool is disposed has current flowing, the following formula can be used to compute the distance from the structure to the conductive structure:

$$Dis = k_4 \frac{(1 + \alpha_1) \cdot D}{1 - \alpha_1} \quad (7a)$$

$$Dis = k_4 \frac{(1 + \alpha_2) \cdot D}{\alpha_2 - 1} \quad (7b)$$

where $$\alpha_1 = \mathrm{abs}\left(\frac{H_{Minimum} - H_{Average}}{H_{Maximum} - H_{Average}}\right),$$

$$\alpha_2 = \mathrm{abs}\left(\frac{H_{Maximum} - H_{Average}}{H_{Minimum} - H_{Average}}\right)$$

and $k_4$ is a constant which can be determined by calibration.

In various embodiments, received signals at receiver sensors of the tool can be associated with a bin angle of the tool, where the bin angle corresponds to an angle of the tool when the signal is collected. An inversion process using a measured parameter of the received signals and the bin angle can be performed to generate an azimuthal angle of the tool with respect to the conductive structure. Inversion is a process of searching for optimum match between simulated data and measurements. Performing the inversion process can include using curve-fitting functions. Examples of curve fitting functions include $$H_{\phi_{Bin}}^T = A_T \frac{\cos(\phi_{Bin} + \phi_0)}{\sqrt{dis^2 + D^2 - 2 \cdot dis \cdot D \cdot \cos(\phi_{Bin} + \phi_0)}} + B_T,$$

for tangential direction measurements, and $$H_{\phi_{Bin}}^N = A_N \frac{\cos\left(\phi_{Bin} + \phi_0 + \frac{\pi}{2}\right)}{\sqrt{dis^2 + D^2 - 2 \cdot dis \cdot D \cdot \cos(\phi_{Bin} + \phi_0)}} + B_N,$$

for normal direction measurements, where $B_T$ is an average tangential magnetic field, $B_N$ is an average normal magnetic field, $A_T$ and $A_N$ are curve-fitting coefficients, dis is the distance from the tool to the conductive structure, $\phi_{Bin}$ is bin angle, D is distance between center of the receiver sensors and center of a tool structure on which the receiver sensors are mounted, and $\phi_0$ is azimuthal angle of the tool structure with respect to the conductive structure. Four parameters, with respect to the conductive structure in FIG. 5, that can be inverted include A, B, dis, and azimuthal angle $\phi_0$. For tangential direction measurements, $\alpha_1$ and $\alpha_2$ factors become $$\alpha_1 = \mathrm{abs}\left(\frac{H_{Minimum}^T - B_T}{H_{Maximum}^T - B_T}\right),$$

$$\alpha_2 = \mathrm{abs}\left(\frac{H_{Maximum}^T - B_T}{H_{Minimum}^T - B_T}\right).$$

Figure 11:
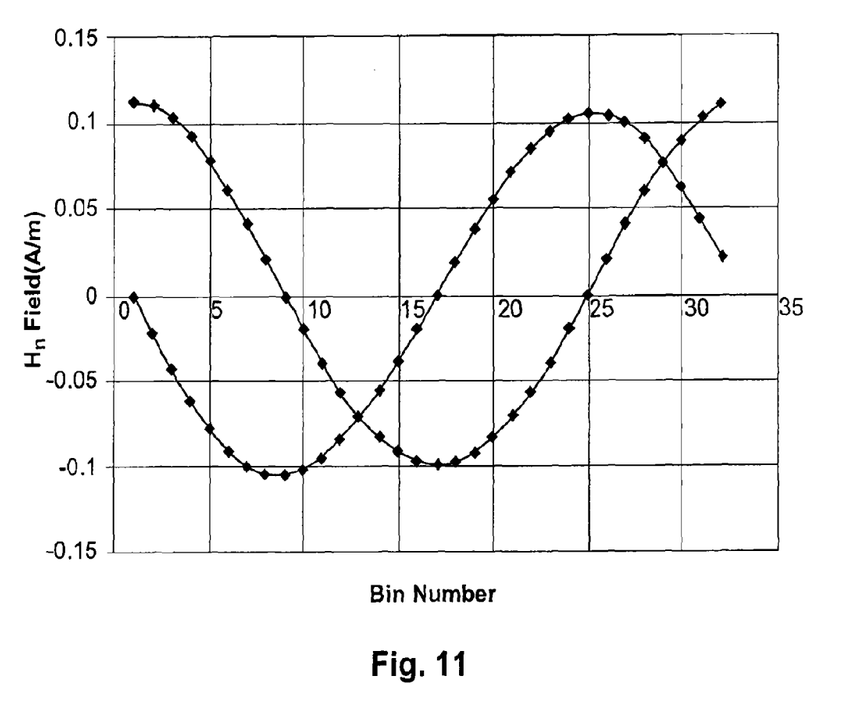
FIG. 11 shows two bins at which a curve of a tangential magnetic field and a curve of a normal magnetic field intersect, in accordance with various embodiments.

FIG. 11 shows two bins at which a curve of a tangential magnetic field and a curve of a normal magnetic field intersect. The two curves are provided by plotting FIG. 7A and FIG. 8 in one figure. As shown in FIG. 11, these curves in one figure display two bins at which the two curves intersect. One bin with negative value has 135° bin shift respect to the conductive structure; the other bin with positive value has a −45° bin shift, which is a fast method to determine the direction of the conductive structure. If the measurements of FIG. 7B are subtracted from the average of the data and the curve is plotted in the same figure with the curve of FIG. 8, one can attain almost the same results of FIG. 11.

In various embodiments, orthogonal coils can be used as receivers, which can measure tangential and normal direction magnetic fields on the surface of a drilling tool. Methodologies as taught herein can be used to detect the position of a conductive structure when there is a current flow on the conductive structure. Methodologies as taught herein can be used to determine relative azimuthal angle of a casing with respect to a drilling tool and can be used to compute the distance between the casing and the drilling tool. The tool can be used in rotation and can be used without rotation such as with the tool sliding down a borehole.

Various components of a system including a tool, having receiver sensors arranged to receive signals in response to current flowing on a conductive structure and having a data processing unit to process the magnetic-related values based on the received signals to determine, relative to the tool structure, the position of the conductive structure, as described herein or in a similar manner, may be realized in combinations of hardware and software based implementations. These implementations may include a machine-readable storage device having machine-executable instructions, such as a computer-readable storage device having computer-executable instructions, to acquire signals corresponding to received signals in two receiver sensors of a tool disposed below the earth's surface, the two receiver sensors arranged orthogonal to each other; generate magnetic-related values from the acquired signals; and process the magnetic-related values to determine, relative to a structure to which the two receiver sensors are coupled, a position of a conductive structure from which the received signals were generated in response to current flowing on the conductive structure. The instructions can include instructions to manage the tool and detect conductive structure using magnetic-related values in accordance with the teachings herein. Further, a machine-readable storage device, herein, is a physical device that stores data represented by physical structure within the device. Examples of machine-readable storage devices include, but are not limited to, read only memory (ROM), random access memory (RAM), a magnetic disk storage device, an optical storage device, a flash memory, and other electronic, magnetic, and/or optical memory devices.

Figure 12:
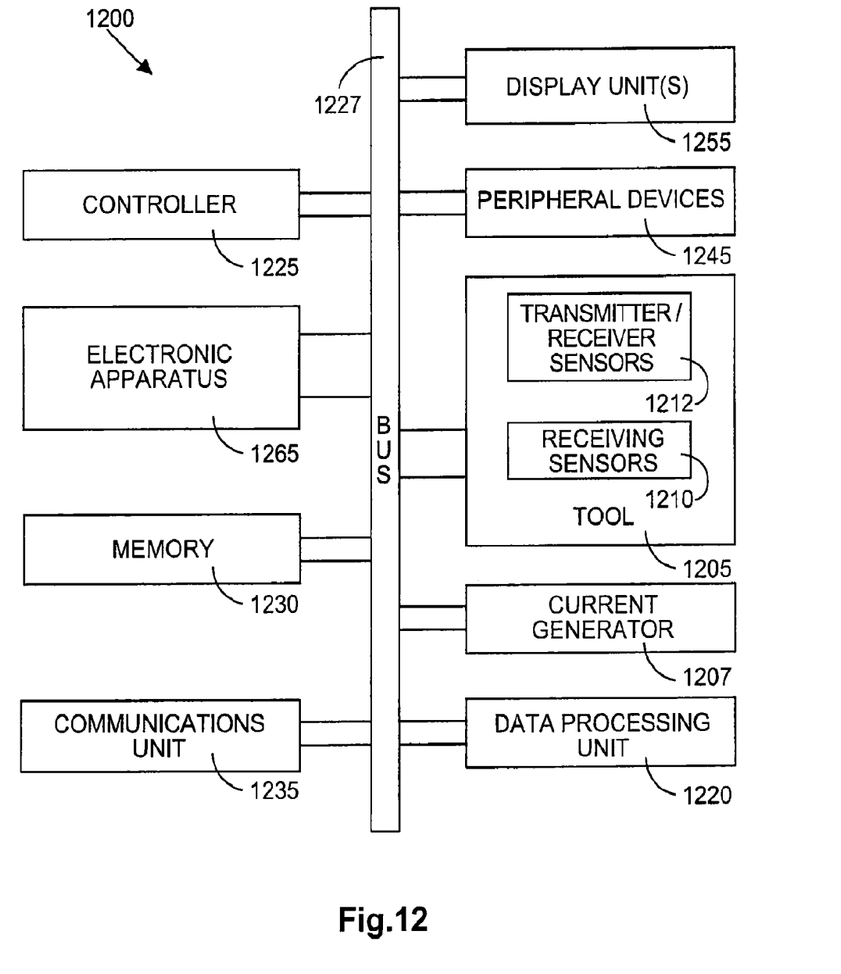
FIG. 12 depicts a block diagram of features of an example system having a tool configured with receiver sensors, in accordance with various embodiments.

FIG. 12 depicts a block diagram of features of an example embodiment of a system 1200 having a tool 1205 configured with sensors arranged to determine a conductive structure below the earth's surface based on magnetic-related measurements in response to current flowing on the conductive structure. The sensors can be arranged as one or more pairs of receiver sensors, where the two receiver sensors of each pair can be arranged orthogonal to each other. The structure on which the receiver sensors may be attached may be a drilling pipe. The conductive structure whose position is to be determined may include a casing of a well. System 1200 includes tool 1205 having an arrangement of receiver sensors 1210 that can be realized in a similar or identical manner to arrangements of sensors discussed herein. Tool 1205 may include transmitters/receivers 1212 to make other measurements. System 1200 can be configured to operate in accordance with the teachings herein.

System 1200 can include a controller 1225, a memory 1230, an electronic apparatus 1265, and a communications unit 1235. Controller 1225, memory 1230, and communications unit 1235 can be arranged to operate as a processing unit to control operation of tool 1205 having an arrangement of receiver sensors 1210 and to perform operations on the signals collected by tool 1205 to determine a distance of tool 1205 to a conductive structure, such as a casing or other piping, in a manner similar or identical to the procedures discussed herein. Such a processing unit can be realized using a data processing unit 1220, which can be implemented as a single unit or distributed among the components of system 1200 including electronic apparatus 1265. Controller 1225 and memory 1230 can operate to control activation of transmitters/receivers 1212 and selection of receiver sensors 1210 in tool 1205 and to manage processing schemes in accordance with measurement procedures and signal processing as described herein. Controller 1225 may control current generator 1207 to flow a current on the conductive structure whose position is to be determined. System 1200 can be structured to function in a manner similar to or identical to structures associated with FIGS. 1-11.

Communications unit 1235 can include downhole communications for appropriately located sensors. Such downhole communications can include a telemetry system. Communications unit 1235 may use combinations of wired communication technologies and wireless technologies at frequencies that do not interfere with on-going measurements.

System 1200 can also include a bus 1227, where bus 1227 provides electrical conductivity among the components of system 1200. Bus 1227 can include an address bus, a data bus, and a control bus, each independently configured or in an integrated format. Bus 1227 can be realized using a number of different communication mediums that allows for the distribution of components of system 1200. Use of bus 1227 may be regulated by controller 1225.

In various embodiments, peripheral devices 1245 can include additional storage memory and/or other control devices that may operate in conjunction with controller 1225 and/or memory 1230. In an embodiment, controller 1225 is realized as a processor or a group of processors that may operate independently depending on an assigned function. Peripheral devices 1245 can be arranged with one or more displays 1255, as a distributed component on the surface, that can be used with instructions stored in memory 1230 to implement a user interface to monitor the operation of tool 1205 and/or components distributed within system 1200. The user interface can be used to input operating parameter values such that system 1200 can operate autonomously substantially without user intervention.

Figure 13:
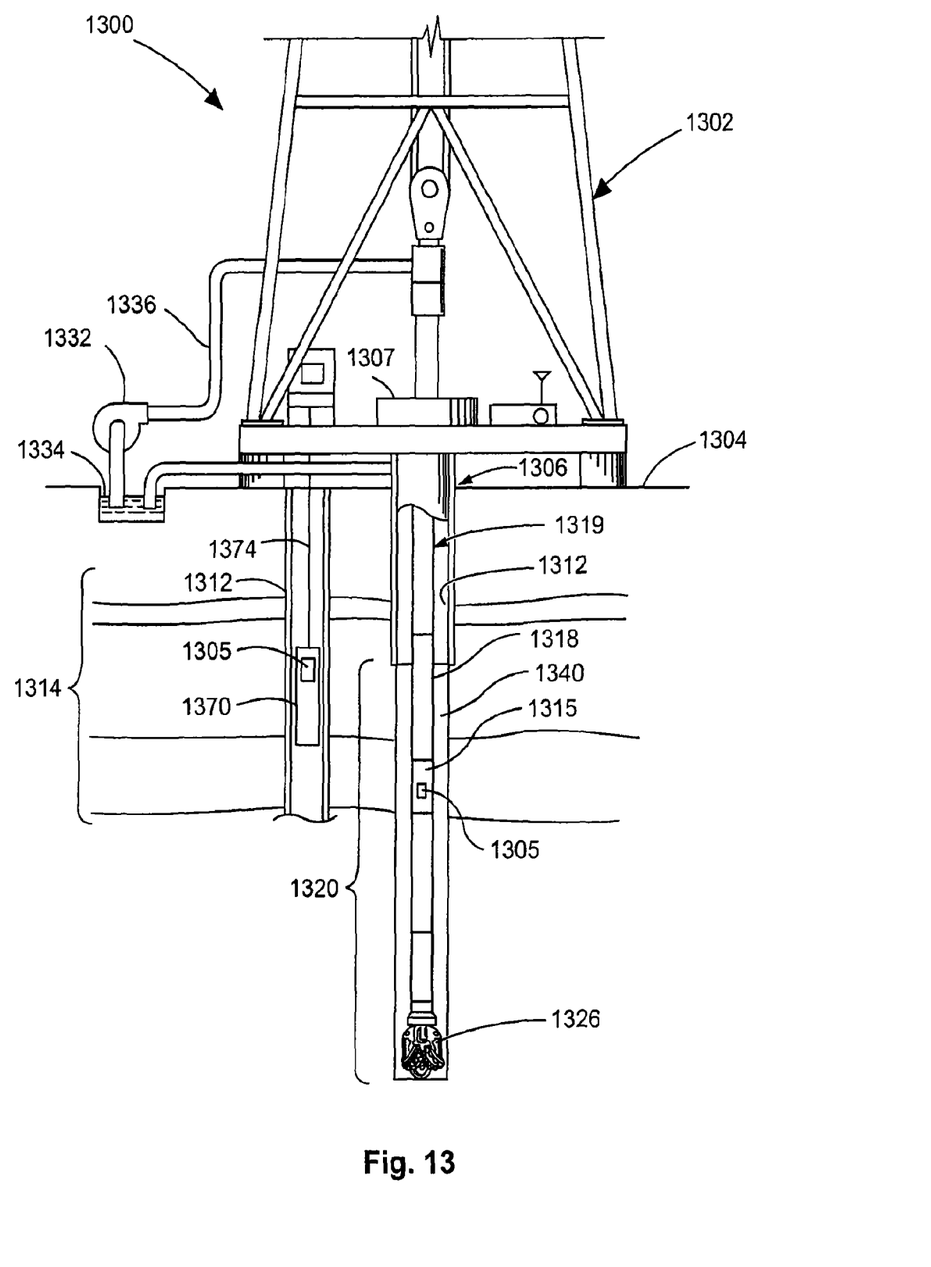
FIG. 13 depicts an example system at a drilling site, where the system includes a tool configured with receiver sensors, in accordance with various embodiments.

FIG. 13 depicts an embodiment of a system 1300 at a drilling site, where system 1300 includes a measurement tool 1305 configured with sensors and data processing unit, arranged to determine a conductive structure below the earth's surface based on magnetic-related measurements in response to current flowing on the conductive structure. The sensors can be arranged as one or more pairs of receiver sensors, where the two receiver sensors of each pair can be arranged orthogonal to each other. The structure on which the receiver sensors may be attached may be a drilling pipe. The conductive structure whose position is to be determined may include a casing of a well. System 1300 includes tool 1305 having arrangements of receivers, control unit, and data processing unit that can be realized in a similar or identical manner to arrangements discussed herein.

System 1300 can include a drilling rig 1302 located at a surface 1304 of a well 1306 and a string of drill pipes, that is, drill string 1319, connected together so as to form a drilling string that is lowered through a rotary table 1307 into a wellbore or borehole 1312. The drilling rig 1302 can provide support for drill string 1319. The drill string 1319 can operate to penetrate rotary table 1307 for drilling a borehole 1312 through subsurface formations 1314. The drill string 1319 can include drill pipe 1318 and a bottom hole assembly 1320 located at the lower portion of the drill pipe 1318.

The bottom hole assembly 1320 can include drill collar 1315, measurement tool 1305 attached to drill collar 1315, and a drill bit 1326. The drill bit 1326 can operate to create a borehole 1312 by penetrating the surface 1304 and subsurface formations 1314. Measurement tool 1305 can be structured for an implementation in the borehole of a well as a measurements-while-drilling (MWD) system such as a logging-while-drilling (LWD) system to detect a conductive structure such as a casing or other conductive structure. The determination of the position of the conductive structure can be used to direct a drilling operation relative to the detected conductive structure. Measurement tool 1305 can be structured for an implementation in an offshore environment. The housing containing measurement tool 1305 can include electronics to collect responses from receivers of measurement tool 1305. Such electronics can include a data processing unit to analyze signals sensed by measurement tool 1305 and provide measurement results, such as distance and direction from tool 1305 to a conductive structure, to the surface over a standard communication mechanism for operating a well. Alternatively, electronics can include a communications interface to provide signals sensed by measurement tool 1305 to the surface over a standard communication mechanism for operating a well, where these sensed signals can be analyzed at a processing unit at the surface.

In various embodiments, measurement tool 1305 may be included in a tool body 1370 coupled to a logging cable 1374 such as, for example, for wireline applications. Tool body 1370 containing measurement tool 1305 can include electronics to collect responses from receivers of measurement tool 1305. Such electronics can include a data processing unit to analyze signals sensed by measurement tool 1305 and provide measurement results, such as distance and direction from tool 1305 to a conductive structure, to the surface over a standard communication mechanism for operating a well. Alternatively, electronics can include a communications interface to provide signals sensed by measurement tool 1305 to the surface over a standard communication mechanism for operating a well, where these collected sensed signals are analyzed at a processing unit at the surface. Logging cable 1374 may be realized as a wireline (multiple power and communication lines), a mono-cable (a single conductor), and/or a slick-line (no conductors for power or communications), or other appropriate structure for use in bore hole 1312.

During drilling operations, the drill string 1319 can be rotated by the rotary table 1307. In addition to, or alternatively, the bottom hole assembly 1320 can also be rotated by a motor (e.g., a mud motor) that is located downhole. The drill collars 1315 can be used to add weight to the drill bit 1326. The drill collars 1315 also can stiffen the bottom hole assembly 1320 to allow the bottom hole assembly 1320 to transfer the added weight to the drill bit 1326, and in turn, assist the drill bit 1326 in penetrating the surface 1304 and subsurface formations 1314.

During drilling operations, a mud pump 1332 can pump drilling fluid (sometimes known by those of skill in the art as "drilling mud") from a mud pit 1334 through a hose 1336 into the drill pipe 1318 and down to the drill bit 1326. The drilling fluid can flow out from the drill hit 1326 and be returned to the surface 1304 through an annular area 1340 between the drill pipe 1318 and the sides of the borehole 1312. The drilling fluid may then be returned to the mud pit 1334, where such fluid is filtered. In some embodiments, the drilling fluid can be used to cool the drill bit 1326, as well as to provide lubrication for the drill bit 1326 during drilling operations. Additionally, the drilling fluid may be used to remove subsurface formation 1314 cuttings created by operating the drill bit 1326.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
   controlling two receiver sensors of a tool disposed below the earth's surface such that signals are received in the two receiver sensors, the two receiver sensors arranged orthogonal to each other;
   acquiring signals corresponding to the received signals in the two receiver sensors of the tool disposed below the earth's surface;
   generating magnetic-related values from the acquired signals, the acquired signals correlated to a magnetic field sensed by the two receiver sensors; and
   processing the magnetic-related values to determine, relative to a structure to which the two receiver sensors are coupled, a position of a conductive structure from which the received signals were generated in response to current flowing on the conductive structure, wherein determining the position of the conductive structure includes determining, with no current on the structure and with value of the current on the conductive structure unknown, distance (Dis) from the structure to the conductive structure with respect to a ratio including minimum magnetic field measured, $H_{Minimum}$, and maximum magnetic field measured, $H_{Maximum}$, wherein, the magnetic field representable as having a x component and a y component.

2. A method comprising:
   controlling two receiver sensors of a tool disposed below the earth's surface such that signals are received in the two receiver sensors, the two receiver sensors arranged orthogonal to each other;
   acquiring signals corresponding to the received signals in the two receiver sensors of the tool disposed below the earth's surface;
   generating magnetic-related values from the acquired signals; and
   processing the magnetic-related values to determine, relative to a structure to which the two receiver sensors are coupled, a position of a conductive structure from which the received signals were generated in response to current flowing on the conductive structure, wherein determining the position of the conductive structure includes determining, with no current on the structure and with value of the current on the conductive structure unknown, distance (Dis) from the structure to the conductive structure with respect to a ratio related to minimum magnetic field measured, $H_{Minimum}$, and maximum magnetic field measured, $H_{Maximum}$, wherein D is given by $$Dis = k_1 \frac{(1 + \alpha_1) \cdot D}{1 - \alpha_1}$$

where $$\alpha_1 = abs\left(\frac{H_{Minimum}}{H_{Maximum}}\right),$$

or $$Dis = k_1 \frac{(\alpha_2 + 1) \cdot D}{\alpha_2 - 1}$$

where D is distance between center of the two receiver sensors and center of the structure to which the two receiver sensors are coupled, $$\alpha_2 = abs\left(\frac{H_{Maximum}}{H_{Minimum}}\right)$$

and $k_1$ is a calibration constant such that Dis is determined by one of $(1-\alpha_1)$ or $(\alpha_2-1)$ that is greater than zero.

3. A method comprising:
   controlling two receiver sensors of a tool disposed below the earth's surface such that signals are received in the two receiver sensors, the two receiver sensors arranged orthogonal to each other;
   acquiring signals corresponding to the received signals in the two receiver sensors of the tool disposed below the earth's surface;
   generating magnetic-related values from the acquired signals, the acquired signals correlated to a magnetic field sensed by the two receiver sensors; and
   processing the magnetic-related values to determine, relative to a structure to which the two receiver sensors are coupled, a position of a conductive structure from which the received signals were generated in response to current flowing on the conductive structure, wherein determining the position of the conductive structure includes determining, with current on the structure, distance (Dis) from the structure to the conductive structure with respect to a ratio including minimum magnetic field measured, $H_{Minimum}$, and maximum magnetic field measured, $H_{Maximum}$, wherein, the magnetic field representable as having a x component and a y component.

4. A method comprising:
   controlling two receiver sensors of a tool disposed below the earth's surface such that signals are received in the two receiver sensors, the two receiver sensors arranged orthogonal to each other;
   acquiring signals corresponding to the received signals in the two receiver sensors of the tool disposed below the earth's surface;
   generating magnetic-related values from the acquired signals; and processing the magnetic-related values to determine, relative to a structure to which the two receiver sensors are coupled, a position of a conductive structure from which the received signals were generated in response to current flowing on the conductive structure, wherein determining the position of the conductive structure includes determining, with current on the structure, distance (Dis) from the structure to the conductive structure with respect to a ratio related to minimum magnetic field measured, $R_{Minimum}$, and maximum magnetic field measured, $H_{Maximum}$, wherein, Dis given by $$Dis = k_4 \frac{(1+\alpha_1) \cdot D}{1-\alpha_1}$$

where $$\alpha_1 = \text{abs}\left(\frac{H_{Minimum} - H_{Average}}{H_{Maximum} - H_{Average}}\right),$$

or $$Dis = k_4 \frac{(1+\alpha_2) \cdot D}{\alpha_2 - 1},$$

where D is distance between center of the two receiver sensors and center of the structure to which the two receiver sensors are coupled, $$\alpha_2 = \text{abs}\left(\frac{H_{Maximum} - H_{Average}}{H_{Minimum} - H_{Average}}\right)$$

and $k_4$ is a calibration constant such that Dis is determined by one of $(1-\alpha_1)$ or $(\alpha_2-1)$ that is greater than zero.

5. A method comprising:
controlling two receiver sensors of a tool disposed below the earth's surface such that signals are received in the two receiver sensors, the two receiver sensors arranged orthogonal to each other;
acquiring signals corresponding to the received signals in the two receiver sensors of the tool disposed below the earth's surface;
generating magnetic-related values from the acquired signals; and
processing the magnetic-related values to determine, relative to a structure to which the two receiver sensors are coupled, a position of a conductive structure from which the received signals were generated in response to current flowing on the conductive structure;
associating the received signals at the two receiver sensors with a bin angle of the tool, the bin angle corresponding to an angle of the tool when the signal is collected; and
performing an inversion process using a measured parameter of the received signals and the bin angle to generate an azimuthal angle of the tool with respect to the conductive structure, wherein performing the inversion process includes using curve fitting functions $$H^T_{\phi_{Bin}} = A_T \frac{\cos(\phi_{Bin} + \phi_0)}{\sqrt{dis^2 + D^2 - 2 \cdot dis \cdot D \cdot \cos(\phi_{Bin} + \phi_0)}} + B_T,$$

for tangential direction measurements, $$H^N_{\phi_{Bin}} = A_N \frac{\cos\left(\phi_{Bin} + \phi_0 + \frac{\pi}{2}\right)}{\sqrt{dis^2 + D^2 - 2 \cdot dis \cdot D \cdot \cos(\phi_{Bin} + \phi_0)}} + B_N,$$

for normal direction measurements, where $B_T$ is an average tangential magnetic field, $B_N$ is an average tangential magnetic field, $A_T$ and $A_N$ are curve fitting coefficients, dis is the distance from the tool to the conductive structure, $\phi_{Bin}$ is bin angle, D is distance between center of the two receiver sensors and center of the structure to which the two receiver sensors are coupled, and $\phi_0$ is azimuthal angle of the tool with respect to the conductive structure.

* * * * *